US009288973B1

(12) United States Patent
Zwayer et al.

(10) Patent No.: US 9,288,973 B1
(45) Date of Patent: Mar. 22, 2016

(54) THUMB BUTTON FOR FISHING REELS

(71) Applicant: W.C. Bradley/Zebco Holdings, Inc., Tulsa, OK (US)

(72) Inventors: Kent L. Zwayer, Tulsa, OK (US); Robert Wilson, Tulsa, OK (US)

(73) Assignee: W.C. BRADLEY/ZEBCO HOLDINGS, INC., Tulsa, OK (US)

( * ) Notice: Subject to any disclaimer, the term of this patent is extended or adjusted under 35 U.S.C. 154(b) by 108 days.

(21) Appl. No.: 13/935,287

(22) Filed: Jul. 3, 2013

(51) Int. Cl.
*A01K 89/01* (2006.01)

(52) U.S. Cl.
CPC .................................. *A01K 89/0102* (2013.01)

(58) Field of Classification Search
USPC ........................... 242/238, 310, 312, 313, 314
See application file for complete search history.

(56) References Cited

U.S. PATENT DOCUMENTS

| | | | | |
|---|---|---|---|---|
| 2,668,025 | A * | 2/1954 | Hull | 242/238 |
| 3,836,092 | A * | 9/1974 | Hull | 242/238 |
| 4,415,129 | A | 11/1983 | Neufeld | |
| 4,548,367 | A | 10/1985 | Councilman | |
| 4,760,973 | A | 8/1988 | Hlava | |
| 4,961,547 | A * | 10/1990 | Peterson et al. | 242/238 |
| 5,137,227 | A | 8/1992 | Allis et al. | |
| 5,199,665 | A * | 4/1993 | Tipton | 242/305 |
| D336,326 | S | 6/1993 | Chapman | |
| 5,236,148 | A | 8/1993 | Valentine | |
| 5,318,242 | A * | 6/1994 | Kirby et al. | 242/238 |
| D374,475 | S | 10/1996 | Robbins | |
| D376,409 | S | 12/1996 | Zwayer et al. | |
| 5,692,692 | A | 12/1997 | Zwayer | |
| 5,782,419 | A | 7/1998 | Pulliam | |
| 6,000,652 | A | 12/1999 | Zwayer et al. | |
| 6,032,892 | A * | 3/2000 | Epperson | 242/227 |
| 6,070,822 | A | 6/2000 | Zwayer et al. | |
| 6,138,935 | A * | 10/2000 | Zwayer et al. | 242/311 |
| D459,430 | S | 6/2002 | Burke | |
| D460,994 | S | 7/2002 | Burke | |
| 6,641,070 | B1 * | 11/2003 | Wong | 242/312 |
| 6,726,137 | B1 * | 4/2004 | Li | 242/238 |

* cited by examiner

*Primary Examiner* — Emmanuel M Marcelo
(74) *Attorney, Agent, or Firm* — Fellers, Snider, Blankenship, Bailey & Tippens, P.C.

(57) ABSTRACT

A fishing reel, such as a spincast reel, that includes a body having a frame that defines a thumb button attachment member on a rear side of the frame. A spool and spinner head are rotatably mounted forward of a front side of the frame. A front cover is secured to a front side of the frame to enclose components. A thumb button is pivotally secured to the thumb button attachment member. The thumb button has an actuating post that extends forwardly for applying force to a rearward end of a center shaft when the thumb button is depressed. A back cover is affixed to the rear side of the frame. The back cover defines a thumb button orifice for allowing a user to access the thumb button when the back cover is secured to the frame.

13 Claims, 4 Drawing Sheets

THUMB BUTTON FOR FISHING REELS

FIELD OF THE INVENTION

The present invention relates to a thumb button in a fishing reel. More particularly, but not by way of limitation, the present invention relates to a thumb button configuration in a spincast reel.

BACKGROUND OF THE INVENTION

Spincast reels are well known in the art. A spincast reel will typically include a central body including a frame, a front cover positionable over at least the front face of the frame and having a tapered forward wall, a back cover positionable over at least the back face of the frame, a casting button projecting from the back cover, and a crank handle extending from a side of the fishing reel. Most of the operating structures and operating mechanisms of the reel are either mounted on, formed on, or mounted through the body and frame. As discussed below, the crank handle is operable for winding a fishing line around a spool contained within the reel. The spool is typically mounted on a spool hub that projects forwardly from the front of the frame.

A spincast reel will also include a foot structure for securing the reel on a fishing rod. The foot structure typically extends from either the bottom of the body or from the bottom of the back cover.

Operating structures and mechanisms contained in a typical spincast reel include an elongate main or center shaft that slidably and rotatably extends through the frame and through the spool, a spinner head secured to the forward end of the main or center shaft, a pinion gear positioned around the main shaft, a crankshaft extending from the crank handle into the side of the reel and through a crankshaft boss provided on the rearward face of the frame, a drive gear or face gear secured on the crankshaft, an anti-reverse mechanism, such as a ratchet/pawl-type mechanism, in communication with the crankshaft for preventing reverse rotation of the crank handle and crankshaft, and an adjustable drag system.

A pinion gear is typically retained in the reel adjacent the rear face of the frame. The pinion gear is keyed on the main or center shaft for imparting rotational movement to the center shaft while allowing the shaft to slide longitudinally through the frame. The crankshaft drive gear operably engages the pinion gear such that rotational movement is imparted to the main shaft by turning the crank handle.

When an excessive pulling force is applied to the fishing line, the drag system counteracts the anti-reverse mechanism of the reel to payout a sufficient amount of additional fishing line to prevent the line from breaking. Most drag systems function to allow either an adjustable resistance to rotational slippage of the line spool about the spool hub or to allow an adjustable resistance to rotational slippage of the drive gear about the crankshaft. A typical drag system will also include an external adjustment mechanism, such as either a finger-operated drag wheel projecting from the reel housing or a star-shaped dial operably secured adjacent the crank handle on the exterior end of the crankshaft.

The spinner head attached to the forward end of the main shaft winds fishing line on the reel spool. While winding, the spinner head is positioned over the spool. When the user turns the crank handle, the rotational movement of the handle is mechanically transferred to the spinner head by means of the drive or face gear, the pinion gear, and the center shaft. The spinner head typically includes a mechanism for holding and positioning the fishing line so that, as the spinner head rotates, the spinner head wraps line around the spool. The mechanism is typically a set of line-grasping notches formed in a rearward edge of the spinner head or a spring-loaded pickup pin or pins that project laterally through a sidewall of the spinner head.

A spincast reel will also typically include a biasing member for biasing the main or center shaft rearwardly toward engagement with the casting button. The biasing member commonly consists of a spring positioned around the rearward portion of the center shaft. The spring is typically attached to or retained by the rearward end of the main shaft such that the spring also holds the pinion or center shaft gear against the reel frame.

When casting a spincast reel, a user initially presses and holds the thumb button whereby the main shaft and the spinner head move forward and the spinner head clamps the fishing line against the tapered forward wall of the front cover. The line is thus prevented from moving outward, i.e., the line is prevented from paying out during the power portion of the casting motion. The forward movement of the center shaft and spinner head also typically activates a locking mechanism that limits the rearward movement of the spinner head such that the spinner head is prevented from returning to its winding position and disengages the line-grasping mechanism.

At the end of the casting motion, the user releases the thumb button to allow the shaft spring to move the center shaft and the spinner head rearwardly such that the fishing line is no longer clamped against the tapered forward wall of the front cover. With the line released and the spinner head prevented from grasping or otherwise engaging the fishing line, the line flows freely over the forward end of the line spool and through a line opening provided in the forward end of the front cover.

After casting, the user returns the spinner head and the line-grasping mechanism to their winding positions by turning the crank handle. One or more cam lobes or other release mechanisms are typically provided on the frame or elsewhere in the reel for releasing the spinner head locking mechanism in response to rotational movement of the spinner head.

A typical prior art casting button includes a pair of upper, opposing pivot pins projecting outwardly from the sides of casting button. The pivot pins are pivotably retained in apertures, bosses, C-shaped slots, or other structures provided within or on the rear cover of the spincast reel.

Casting buttons of the type used in the art may have a tendency to rattle against the back cover, which is viewed by some as reflecting lower quality. Additionally, proper orientation of the casting button is contingent upon a correct and secure attachment of the rear cover on the body of the spincast reel.

SUMMARY OF THE INVENTION

The fishing reel of the present invention includes a body having a front side and a rear side. The body includes a frame having a front side and a rear side. The frame defines an axial orifice that communicates the front side and the rear side. A thumb button attachment member is located rearward of the rear side of frame.

A spool is rotatably mounted to the front side of the frame. A spinner head assembly is secured to the threaded front end of the center shaft assembly, also on the front side of the frame. The spinner head assembly has spring biased pick up pins.

A front cover assembly is secured to a front side of the frame and encloses the spool, the spinner head assembly and other components.

A drive gear assembly is mounted to the rear of the frame. The drive gear has a crankshaft mounted transversely to the center shaft. The crankshaft supports a face gear disk that defines a face gear on a first side for engaging the pinion gear of the center shaft. The drive gear further defines a clicker gear on a handle side of the face gear disk.

A thumb button is pivotally secured to the thumb button attachment member on the frame. The thumb button has a thumb receiving surface and an actuating post that extends forwardly in a direction opposite of the thumb receiving surface. The actuating post is for applying force to the rearward end of the center shaft when the thumb button is depressed. The actuating post defines a concave receiving area. A flexible biasing member extends forwardly of the actuating post for engaging the rearward end of the center shaft and for biasing the thumb button into a ready position. The flexible biasing member has a receiving area that defines a curved cross-section. A concave side of the curved cross-section of the flexible biasing member receives the rearward end of the center shaft. A convex side of the receiving area of the flexible biasing member is received within the concave receiving area of the actuating post for ensuring that the rearward end of the center shaft is centered on the actuating post.

The thumb button is provided for selectively forcing the center shaft forwardly through the frame, thereby permitting the fishing line to flow freely from the reel or be clamped in preparation for casting.

A back cover is affixed to the frame. The back cover defines a thumb button orifice for allowing a user to access the thumb button when the back cover is secured to the frame.

One advantage associated with affixing the thumb button to the frame, rather than to the rear cover, is that cosmetic alterations to the rear cover may be made without the necessity of re-designing a rear cover thumb button attachment.

DETAILED DESCRIPTION OF THE PREFERRED EMBODIMENTS

Figure 1:
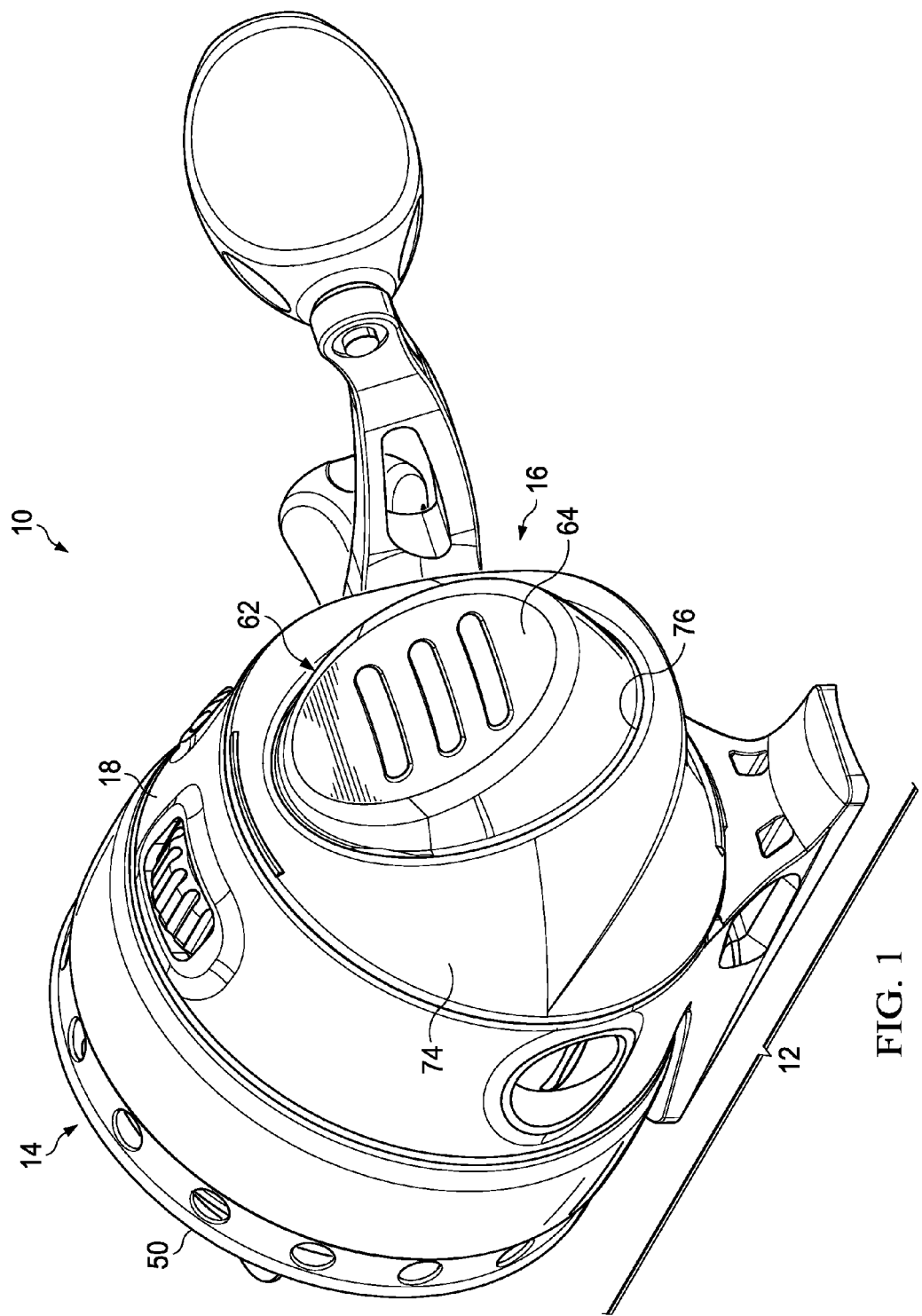
FIG. 1 is a rear perspective view of the reel of the invention.

Referring to FIGS. 1-4, shown is fishing reel 10. Fishing reel 10 includes a body 12 having a front edge 14 and a rear edge 16. Body 12 includes frame 18 having a front side 20 and a rear side 22. An outside surface of frame 18 is substantially cylindrical in shape. Rear side 22, therefore, defines a shape that approximates a circle. Preferably, rear side 22 is provided with a circular ridge or back cover receiving tabs 23. Frame 18 defines an axial orifice 24 that communicates front side 20 with rear side 22 of frame 18.

Frame 18 defines thumb button attachment member 26 on rear side 22 of frame 18. Thumb button attachment member 26 may be molded along with frame 18 or may be attached thereto. In one embodiment, thumb button attachment member 26 is a post and orifice for receiving a mating post and orifice of a thumb button, but may be a pair of posts or a pair of orifices or other hinge means of pivotally attaching thumb button 62 to frame 18.

Center shaft 28 (FIGS. 2, 3) is slidably received within axial orifice 24 of frame 18. Center shaft 28 has a threaded front end 30 and a rear end 32. Center shaft 28 is biased rearwardly by center shaft spring 33. Pinion gear 34 is slidably keyed onto center shaft 28.

Figure 2:
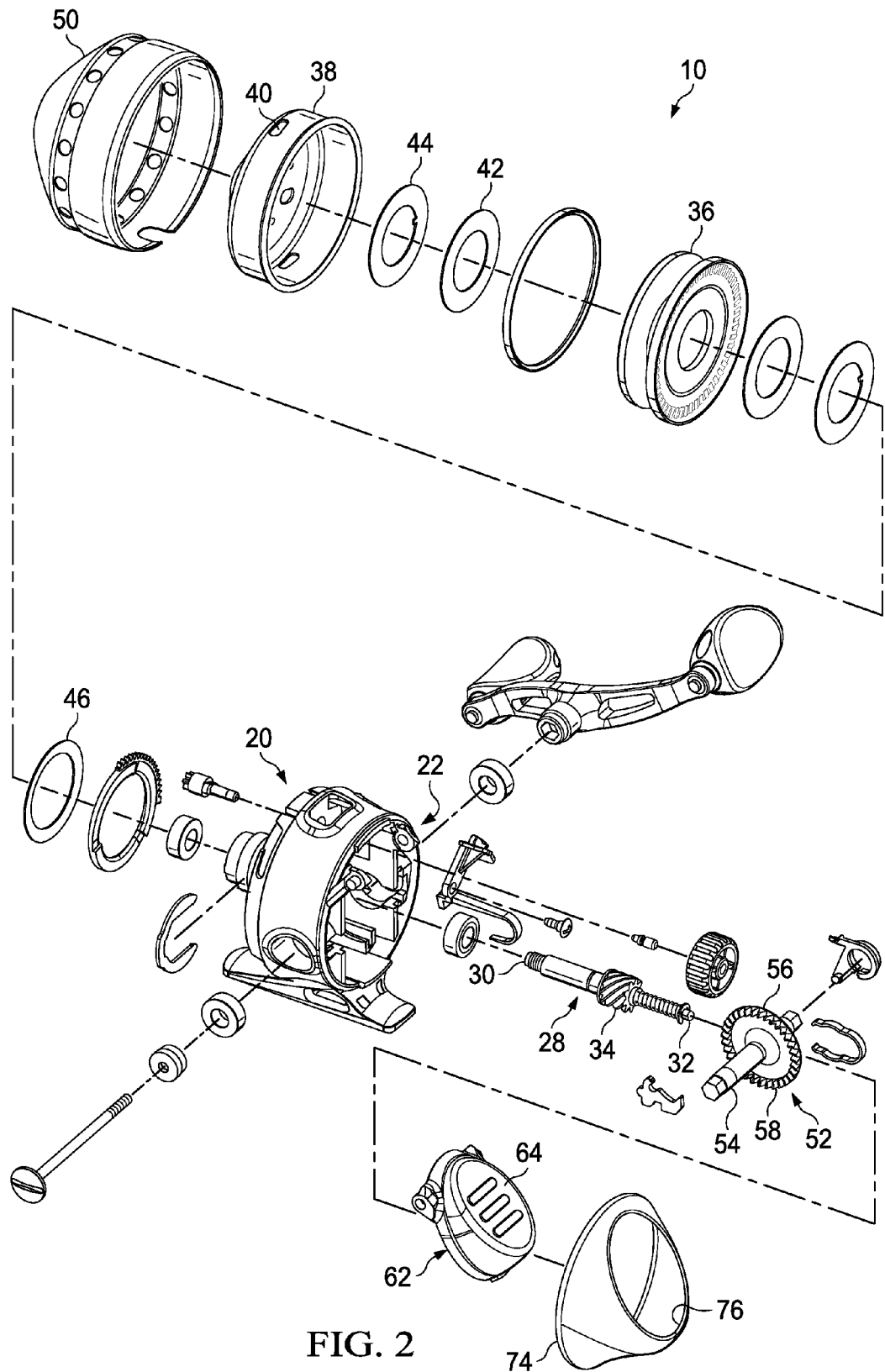
FIG. 2 is an exploded view of the reel of FIG. 1.
Figure 3:
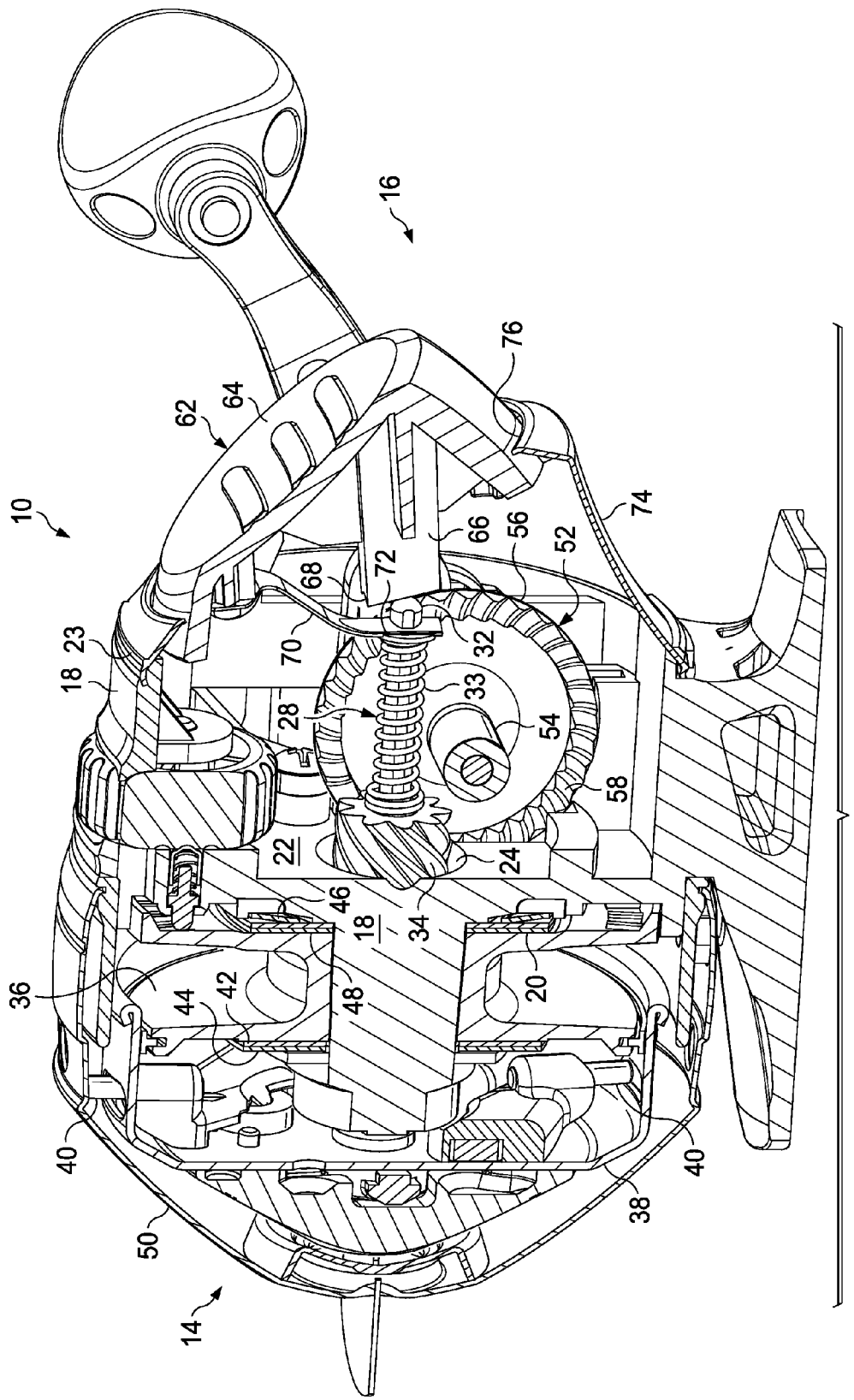
FIG. 3 is a perspective cross-sectional view of the reel of FIG. 1.
Figure 4:
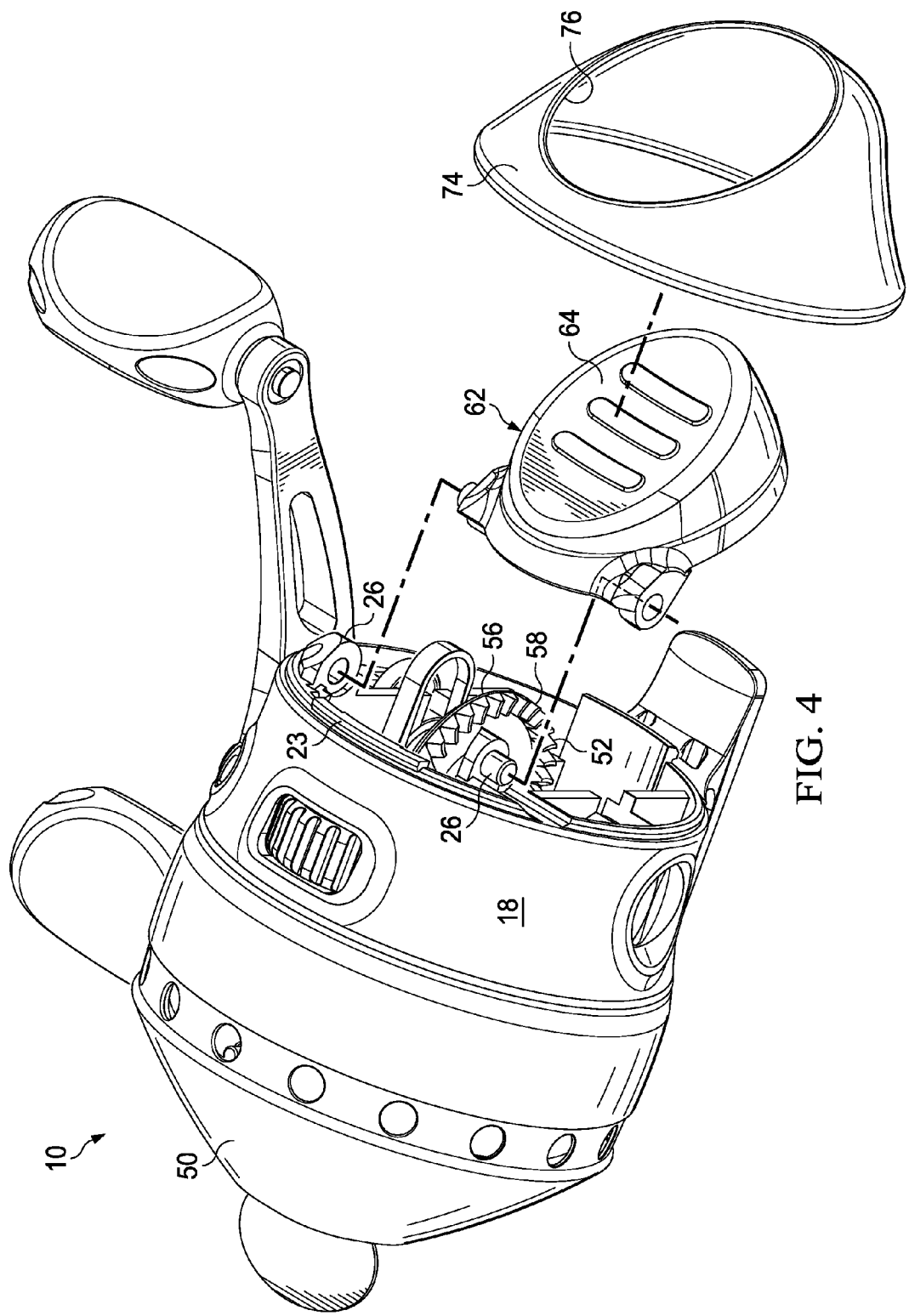
FIG. 4 is partially disassembled top view of the reel of FIG. 1.

As best seen in FIG. 3, spool 36 is rotatably mounted onto frame 18 adjacent front side 14 of frame 18. Spinner head assembly 38 is secured to threaded front end 30 of center shaft 28 on front side 20 of frame 18. Spinner head assembly 38 is provided with spring biased pickup pins 40 (FIG. 2).

Drag washer 42 is provided between spool 36 and spinner head assembly 38. Keyed drag washer 44 is provided between drag washer 42 and spinner head assembly 38. Wave washer 46 is provided between rear side 22 of frame 18 and spool 36. A plurality of washers 48 are located between wave washer 46 and spool 36.

Front cover assembly 50 is secured to front side 20 of frame 18 for enclosing spool 36, spinner head assembly 36, and washers 42, 44, and 46.

Crank gear assembly 52 is mounted on rear side 22 of frame 18. Crank gear assembly 52 includes a crankshaft 54 mounted transversely to center shaft 28. Crankshaft 54 supports face gear disk 56. Face gear disk 56 defines face gear 58 on a first side for engaging pinion gear 34 of center shaft 28. Crank gear assembly 52 further defines a clicker gear (not shown) on a second side of face gear disk 56.

Thumb button 62 is pivotally secured to thumb button attachment member 26 on frame 18. Thumb button 62 defines thumb receiving surface 64. Thumb button 62 further defines actuating post 66 (FIG. 3) on a side opposite of said thumb receiving surface 64. Actuating post 66 is provided for applying force to rear end 32 of center shaft 28 when thumb button 62 is depressed. Actuating post 66 defines a concave receiving area 68.

Thumb button 62 further includes a flexible biasing member 70 extending forwardly of activating post 66 for engaging rear end 32 of center shaft 28. Flexible biasing member 70 is for biasing thumb button 28 into a ready position, i.e., for biasing thumb button 62 outwardly. Flexible biasing member 70 preferably defines a receiving area 72 having a curved cross section wherein a concave side of the curved cross section of receiving area 72 receives rear end 32 of center shaft 28. Receiving area 72 of flexible biasing member 70 additionally defines a convex side that is received within concave receiving area 68 of actuating post 66 for insuring that rear end 32 of center shaft 28 is centered on actuating post 66.

Back cover 74 is affixed to rear side 22 of frame 18. In one embodiment, back cover 74 is snapped onto a circular ridge formed on a rear side 22 of frame 18. In another embodiment, rear cover 74 snaps onto back cover receiving tabs 23. Other means of fastening back cover 74 to frame 18 are also possible. Back cover 74 defines thumb button orifice 76 so that thumb button 62 is accessible by a user.

Downward pressure on thumb receiving surface 64 of thumb button 62 results in thumb button assembly 62 pivoting about thumb button attachment member 26 so that actuating post 66 engages and shifts forwardly center shaft 28. Movement of center shaft 28 in a forward direction shifts spinner head assembly 38 forwardly and retracts pickup pins 40. Additionally, depressing thumb button 62 forces center shaft 28 forwardly through frame 18 for releasing tension on drag washers 42 and wave washer 46, thereby facilitating low friction rotation of spool 36.

Reel 10 is thereby placed in a cast mode wherein spinner head assembly 38 is pressed against an inside surface of front cover assembly 50. Casting is then effected by cocking the rod with thumb button 62 depressed and simultaneously thrusting the rod and releasing thumb button 62 to allow line to pay out freely from spool 36. The remaining specific mechanism through which the reel is operated is generally known and does not form a part of this invention. Therefore, a detailed discussion of the reel operation is omitted. A reel operating mechanism for an exemplary spincast fishing reel is described in U.S. Pat. No. 4,415,129 to Neufeld, which patent is hereby incorporated by reference.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
a frame having a thumb button attachment member;
a thumb button pivotally secured to said thumb button attachment member;
a back cover affixed to said frame, said back cover defining a thumb button orifice that receives said thumb button for allowing a user to access said thumb button when said back cover is secured to said frame.

2. The fishing reel according to claim 1 wherein:
said frame defines an axial orifice;
a center shaft slidably received in said axial orifice, said center shaft having a rearward end;
an actuating post extending from said thumb button for applying force to said rearward end of said center shaft when said thumb button is depressed.

3. The fishing reel according to claim 2 wherein:
said center shaft is biased rearwardly towards said thumb button by a spring.

4. The fishing reel according to claim 2 wherein:
said actuating post of said thumb button defines a concave receiving area;
a flexible biasing member is affixed to said thumb button and extends forwardly of said actuating post for engaging said rearward end of said center shaft and for biasing said thumb button into an extended position.

5. The fishing reel according to claim 4 wherein:
said flexible biasing member defines a receiving area having a curved cross-section wherein a concave side of said flexible biasing member receives said rearward end of said center shaft and a convex side of said flexible biasing member is received within said concave receiving area of said actuating post for centering said rearward end of said center shaft on said actuating post.

6. The fishing reel according to claim 1 wherein:
said thumb button attachment member comprises a portion of a hinge.

7. The fishing reel according to claim 1 wherein:
said back cover is affixed to said frame with a snap fit.

8. A fishing reel comprising:
a body having a frame having a front side and a rear side with a thumb button attachment member;
a spool supported on said front side of said frame;
a thumb button pivotally secured to said thumb button attachment member on said rear side of said frame; and
a back cover affixed to said frame, said back cover defining a thumb button orifice that receives said thumb button for allowing a user to access said thumb button when said back cover is secured to said frame.

9. The fishing reel according to claim 8 wherein:
said back cover is affixed to said frame with a snap fit.

10. The fishing reel according to claim 8 wherein:
said frame defines an axial orifice;
a center shaft is slidably received in said axial orifice, said center shaft having a rearward end;
an actuating post extending from said thumb button for applying force to said rearward end of said center shaft when said thumb button is depressed.

11. The fishing reel according to claim 10 wherein:
said center shaft is biased rearwardly towards said thumb button by a spring.

12. A fishing reel comprising:
a frame having a thumb button attachment member;
a thumb button pivotally secured to said thumb button attachment member;
a back cover affixed to said frame, said back cover defining a thumb button orifice that receives said thumb button for allowing a user to access said thumb button when said back cover is secured to said frame;
said frame defines an axial orifice;
a center shaft slidably received in said axial orifice, said center shaft having a rearward end;
an actuating post extending from said thumb button for applying force to said rearward end of said center shaft when said thumb button is depressed;
said actuating post of said thumb button defines a concave receiving area;
a flexible biasing member is affixed to said thumb button and extends forwardly of said actuating post for engaging said rearward end of said center shaft and for biasing said thumb button into an extended position.

13. The fishing reel according to claim 12 wherein:
said flexible biasing member defines a receiving area having a curved cross-section wherein a concave side of said flexible biasing member receives said rearward end of said center shaft and a convex side of said flexible biasing member is received within said concave receiving area of said actuating post for centering said rearward end of said center shaft on said actuating post.

* * * * *